United States Patent

Martin

[11] 4,034,118
[45] July 5, 1977

[54] METHOD OF SWEETENING OR MELLOWING ONIONS

[76] Inventor: Fred A. Martin, 3840 Arborlawn Drive, Fort Worth, Tex. 76109

[22] Filed: Jan. 5, 1976

[21] Appl. No.: 646,564

[52] U.S. Cl. .............................. 426/431; 206/205; 426/394; 426/419

[51] Int. Cl.$^2$ .............................. A23L 1/212

[58] Field of Search ......... 426/112, 615, 419, 431, 426/486, 506, 115, 119, 124, 106, 323, 324, 325, 132, 133, 410, 415; 206/205

[56] References Cited

UNITED STATES PATENTS

| | | | |
|---|---|---|---|
| 431,278 | 7/1890 | Nellensteyn | 426/486 |
| 2,541,701 | 2/1951 | Karmen | 426/615 |
| 3,138,464 | 6/1964 | Kruse | 426/615 X |
| 3,307,773 | 3/1967 | Kratzer et al. | 426/106 X |
| 3,326,698 | 6/1967 | Sakamoto | 426/386 |
| 3,367,785 | 2/1968 | Finucane et al. | 426/112 |
| 3,607,316 | 9/1971 | Hume | 426/640 |
| 3,689,291 | 9/1972 | Draper | 426/124 X |
| 3,759,721 | 9/1973 | Hawley | 426/523 X |
| 3,798,340 | 3/1974 | Reinbold et al. | 426/506 X |

OTHER PUBLICATIONS

Everybodys Cook Book, Holt & Co., 1924, 1st ed. pp. 760, 685.
Good Housekeeping Cook Book, Rinehart & Co., 1949, pp. 398, 489.
Womans Day Encyclopedia of Cookery, vol. 8, 1966, 3rd ed. p. 1259.
Pickle & Sauce Making, London Food Trade Press, 1962, 2nd ed. binsted pp. 52, 53.

*Primary Examiner*—Steven L. Weinstein
*Attorney, Agent, or Firm*—Richards, Harris & Medlock

[57] ABSTRACT

In a method of sweetening or mellowing onions, onions are first peeled and sliced, and the slices are then placed in the pouch. A liquid, which preferably comprises vinegar, a vinegar and water mixture, or water is then applied to the pouch, after which the pouch may be placed in the liquid retaining envelope. The moistened pouch having the onion slices received therein is then refrigerated from between about 24 hours and about 2-3 days, after which the onion slices are removed from the pouch for use.

6 Claims, 4 Drawing Figures

METHOD OF SWEETENING OR MELLOWING ONIONS

BACKGROUND AND SUMMARY OF THE INVENTION

This invention relates to a method of and sweetening or mellowing onions, and more particularly to a system for rendering onions sufficiently mellow to facilitate their use in salads, sandwiches, and similar applications.

In times past it was possible to purchase so-called sweet onions. By this is meant onions having a sufficiently mild flavor that could be used in salads, sandwiches, and similar applications without overwhelming the flavor of the other ingredients. More recently, however, it has become difficult to obtain this preferred type of onion. To the contrary, most of the onions which are now obtainable on a commercial basis are characterized by an extremely hot flavor. There has thus developed a need for a system for rendering hot onions sufficiently mild to facilitate their use in salads, sandwiches, and similar applications in which the use of sweet onions is preferred.

In accordance with the present invention, an apparatus for sweetening onions includes a pouch adapted to receive one or more slices prepared from previously peeled onions. The pouch may be formed from foam materials, fabric materials, and similiar materials adapted to maintain a liquid in contact with the onion slices. An outer liquid retaining envelope formed from a liquid impervious material may also be provided.

In a method of sweetening onions, onions to be sweetened are first peeled and sliced. Onion slices are then placed in the pouch, after which the pouch is dampened with a liquid. Although various liquids may be utilized in the practice of the invention, the use of vinegar, a vinegar and water mixture, or water is preferred. The pouch and the onion slices received therein may then be placed in the outer liquid retaining envelope.

The moistened pouch and its contents of onion slices is then refrigerated from between about 24 hours and about 2–3 days. By this means the flavor of the onions is substantially mellowed, whereby the previously hot onions resemble sweet onions in flavor. Following refrigeration the onion slices are removed from the pouch and are utilized in salads, sandwiches and similar applications in the same manner as sweet onions.

DESCRIPTION OF THE DRAWINGS

A more complete understanding of the invention may be had by reference to the following Detailed Description when taken in conjunction with the accompanying drawings, wherein.

DETAILED DESCRIPTION

Figure 1:
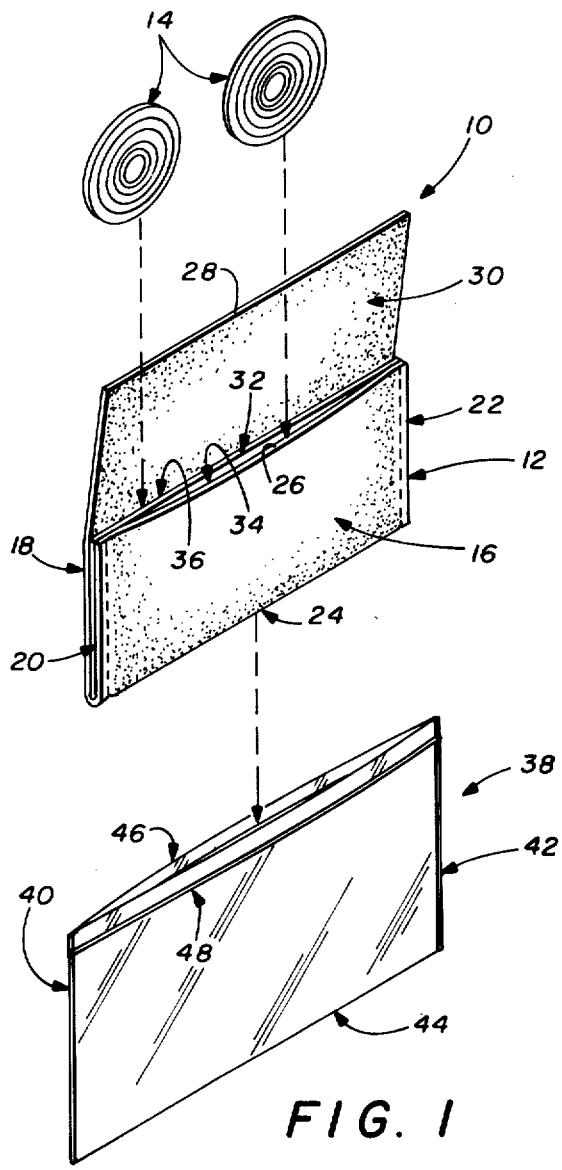
FIG. 1 is an illustration of an apparatus for sweetening onions incorporating the invention.

Referring now to the Drawings, and particularly to FIG. 1 thereof, there is shown an apparatus for sweetening onions 10 incorporating a first embodiment of the invention. The apparatus 10 includes a pouch 12 formed from a liquid retaining material and adapted to receive a plurality of onion slices 14 therein.

The pouch 12 comprises a front panel 16 and a rear panel 18 which are joined along common side edges 20 and 22 and along a common bottom edge 24 to define the pouch 12. For example, the panels 16 and 18 may comprise a single length of material which is folded along the bottom edge 24 and joined along the side edges 20 and 22. The side edges 20 and 22 may be joined by conventional manufacturing techniques such as sewing or otherwise mechanically fastening the panels 16 and 18 to one another, adhesively bonding the panels 16 and 18 to one another, heat sealing the panels 16 and 18 to one another, etc. The front panel 16 has a top edge 26 and the rear panel 18 has a top edge 28 which is positioned substantially beyond the top edge 26 to define a flap 30 which is utilized to close the pouch 12.

The embodiment of the pouch 12 illustrated in FIG. 1 further comprises a panel 32 extending parallel to and between the front panel 16 and the rear panel 18 and secured thereto along the opposite edges 20 and 22. The panel 32 thus divides the pouch 12 into a pair of onion slice receiving pockets 34 and 36. It will be understood that in the practice of the invention the panel 32 may be omitted, whereby the pouch 12 comprises a single onion receiving pocket. Alternatively, additional panels similar to the panel 32 may be mounted between the front panel 16 and the rear panel 18 in which event the pouch 12 will comprise additional onion slice receiving pockets.

The onion slice receiving pouch 12 is formed from a liquid retaining material. For example, the pouch 12 may advantageously be formed from one of the various commercially available foam materials, such as cellulose foam materials, plastic foam materials, or the like. The type of foam material commonly furnished in sheet form for such household uses as washing, polishing, drying, and the like may advantageously be employed in the practice of the invention. Alternatively, the pouch 12 may be formed from various knitted or woven fabric materials. One such material which may advantageously be employed in the practice of the invention comprises the type of fabric material which is commonly utilized for toweling. Other types of materials may also be utilized in the practice of the invention, with the only requirements for the selection of a material for the fabrication of the pouch 12 being that the material not be deleterious to the onions being treated in accordance with the invention, and that the material not be subject to deterioration in the presence of the liquids which are utilized in the practice of the invention.

The apparatus for sweetening onions 10 may further include a liquid retaining envelope 38 adapted to receive the pouch 12 and onion slices contained therein. The envelope 38 preferably comprises opposed panels which are joined along the opposite edges 40 and 42 and along the bottom edge 44 by conventional techniques. The upper end 46 of the envelope 38 is normally open, but is provided with sealing apparatus 48. The closure apparatus 48 may conveniently comprise the zip-closure apparatus commonly employed in household type plastic bags. Other commercially available types of closure apparatus may also be utilized in the practice of the invention, if desired.

Figure 2:
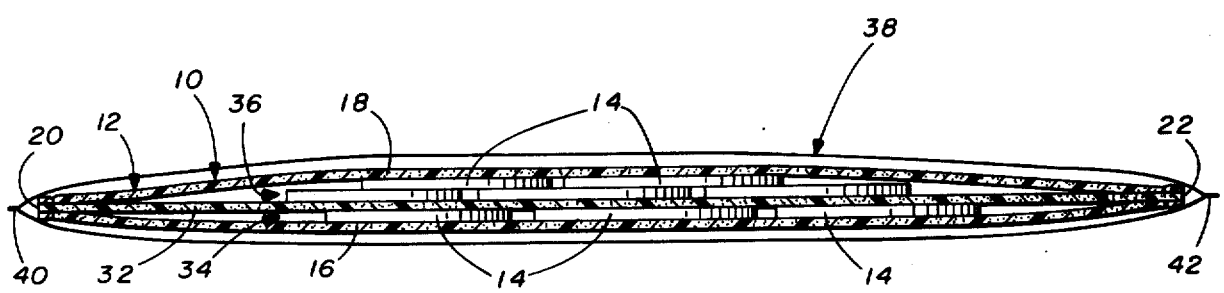
FIG. 2 is a longitudinal sectional view of the apparatus of FIG. 1.

An embodiment of the invention in which the pouch 12 is formed from foam material is illustrated in FIG. 2. Onion slices 14 are preferably received in the pouch in the manner illustrated in the lower portion of FIG. 2. That is, the onion slices 14 are preferably positioned in the pouch 12 with both of the major cut surfaces of each slice engaging an adjacent surface of one of the panels comprising the pouch 12. In this manner sweetening of the onion slices takes place through both major surfaces of each slice simultaneously. Alternatively, the onion slices may be positioned in the pouch 12 in the manner illustrated in the upper portion of FIG. 2, that is, with the slices overlapping one another. When the invention is practiced in this manner sweetening of the onion slices takes place through only one major surface thereof and is therefore necessarily somewhat slower.

Figure 3:
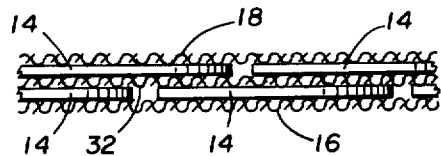
FIG. 3 is a view similar to FIG. 2 and illustrating an alternative embodiment of the invention.

FIG. 3 illustrates an embodiment of the invention in which the pouch 12 is formed from a fabric material. Again, the onion slices 14 are preferably received in the pouch 12 with both major surfaces of each slice engaging adjacent surfaces of panels comprising the pouch 12. In the actual utilization of the invention it has been found that the material selected for the fabrication of the pouch 12 is not determinative of the successful practice of the invention, whereby either foam materials or fabric materials may be utilized in the construction of the pouch 12 with equal facility.

Figure 4:
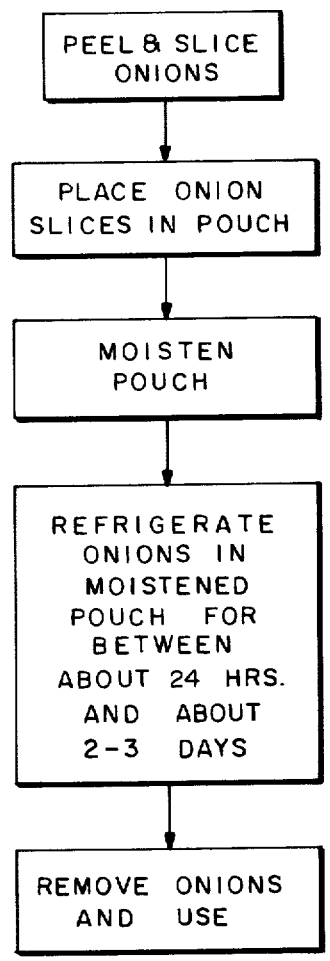
FIG. 4 is a block diagram illustrating a method for sweetening onions incorporating the invention.

A method of sweetening onions incorporating the invention is illustrated in FIG. 4. Onions having a flavor which is too hot to permit the use of the onions in such applications as salads, sandwiches, and the like are selected for processing. Such onions are initially peeled and sliced in accordance with conventional techniques.

The resulting onion slices are then positioned in the pouch 12 illustrated in FIG. 1. A pouch 12 formed from a foam material such as that illustrated in FIG. 2 may be used. Alternatively, a pouch 12 formed from a fabric material such as that illustrated in FIG. 3 may be used. In either event the onion slices are preferably positioned in the pouch with both major surfaces thereof in contact with an adjacent surface of one of the panels of the pouch 12. Alternatively, the onion slices may be positioned in the pouch with only one surface thereof engaging an adjacent surface of one of the panels of the pouch.

After the onion slices are positioned in the pouch (or previously thereto, if desired) the pouch is moistened. This is preferably accomplished by substantially saturating the pouch with a suitable liquid. Although various liquids may be employed in the practice of the invention, the use of either vinegar, or water, or a mixture of vinegar and water is preferred.

The moistened pouch 12 and the onion slices 14 contained therein may then be placed in the liquid retaining envelope 38, if desired. It will be understood that the use of the envelope 38 is merely a convenience in order to retard loss of moisture from the pouch 12 due to dripping and evaporation. Other types of containers for the moistened pouch and the onion slices contained therein may be utilized in the practice of the invention, if desired. Alternatively, the moistened pouch having the onion slices contained therein may simply be placed on a suitable support.

The moistened pouch 12 and the onion slices 14 contained therein are next refrigerated. A refrigerator of the type commonly employed for household use may advantageously be employed for this purpose. Such a device maintains the pouch and the onion slices at a temperature of approximately 40° F.

The duration of the refrigeration step is preferably between about 24 hours and about 2-3 days. Thereafter the onion slices 14 are removed from the pouch and are utilized in the manner of sweet onions. That is, by means of the present invention the flavor of the onion slices is mellowed to such an extent that the onions may advantageously be employed in salads, sandwiches, and similar applications.

From the foregoing, it will be understood that the present invention comprises a convenient method of substantially mellowing the flavor of onions, whereby onions which would otherwise be considered as nonacceptable for use in salads, sandwiches and similar applications may be utilized for such purposes. The use of the invention is advantageous in that it may be practiced with a minimum of equipment and is therefore both economical and convenient. A related advantage involves the fact that the invention may be readily practiced in the home in that no elaborate tools or equipment are required in carrying out the invention. Other advantages will readily suggest themselves to those skilled in the art.

What is claimed is:

1. A method of mellowing onions comprising:
   peeling and slicing at least one onion to provide at least one onion slice having two major cut surfaces;
   placing the resulting onion slice in a pouch comprising a liquid retaining material;
   said pouch comprising opposed panel joined together along the bottom and opposite edges; the onion slice being positioned with at least one major surface of said onion slice engaging an adjacent surface of one of the panels of said pouch;
   substantially moistening the pouch and the onion slice contained therein with a liquid selected from the group consisting of water, vinegar, and mixtures thereof; and
   thereafter refrigerating the mositened pouch in contact with the onion slice contained therein at a temperature of about 40° F and for a period of time of between about 24 hours and about 72 hours.

2. The method of sweetening onions according to claim 1 wherein the refrigeration step is carried out by placing the moistened pouch and the onion slice contained therein in a refrigerator.

3. The method of sweetening onions according to claim 1 wherein the step of moistening the pouch and the onion slice contained therein is carried out by substantially saturating the material comprising the pouch with liquid.

4. The method of sweetening onions according to claim 1, including the additional step of positioning the moistened pouch and the onion slice contained therein in a liquid retaining envelope prior to and during the refrigeration step.

5. The method of sweetening onions according to claim 1 wherein the step of placing the onion slice in a pouch is carried out by placing the onion slice in a pouch comprising a foam material.

6. The method of sweetening onions according to claim 1 wherein the step of placing an onion slice in a pouch is carried out by placing the onion slice in a pouch comprising a fabric material.

* * * * *